(12) United States Patent
Sloo

(10) Patent No.: US 8,296,682 B2
(45) Date of Patent: Oct. 23, 2012

(54) INTERFACE FOR NAVIGATING INTERRELATED CONTENT HIERARCHY

(75) Inventor: David Sloo, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 840 days.

(21) Appl. No.: 12/040,309

(22) Filed: Feb. 29, 2008

(65) Prior Publication Data
US 2009/0222769 A1    Sep. 3, 2009

(51) Int. Cl.
*G06F 3/048* (2006.01)
(52) U.S. Cl. ...................................................... 715/853
(58) Field of Classification Search .................. 715/716, 715/719, 718, 720, 723, 792, 810, 825, 835, 715/853, 854, 855; 725/2, 39, 41, 44, 45, 725/49, 109, 133, 139, 141
See application file for complete search history.

(56) References Cited

U.S. PATENT DOCUMENTS

| | | | |
|---|---|---|---|
| 5,630,042 A * | 5/1997 | McIntosh et al. | 715/744 |
| 6,222,532 B1 * | 4/2001 | Ceccarelli | 715/723 |
| 6,236,400 B1 * | 5/2001 | Guerrero | 715/841 |
| 6,321,229 B1 * | 11/2001 | Goldman et al. | 707/E17.012 |
| 6,412,110 B1 * | 6/2002 | Schein et al. | 725/40 |
| 6,438,549 B1 * | 8/2002 | Aldred et al. | 707/640 |
| 6,505,205 B1 * | 1/2003 | Kothuri et al. | 1/1 |
| 6,577,350 B1 * | 6/2003 | Proehl et al. | 348/564 |
| 6,895,048 B2 | 5/2005 | Boice et al. | |
| 6,938,208 B2 * | 8/2005 | Reichardt | 715/719 |
| 6,970,127 B2 * | 11/2005 | Rakib | 341/173 |
| 7,277,928 B2 * | 10/2007 | Lennon | 709/219 |
| 7,735,104 B2 * | 6/2010 | Dow et al. | 725/52 |
| 7,873,908 B1 * | 1/2011 | Varanasi et al. | 715/763 |
| 2003/0030852 A1 | 2/2003 | Sampson et al. | |
| 2003/0121040 A1 * | 6/2003 | Ferman et al. | 725/40 |
| 2004/0154039 A1 * | 8/2004 | Simms et al. | 725/39 |
| 2004/0268393 A1 * | 12/2004 | Hunleth et al. | 725/44 |
| 2005/0155079 A1 * | 7/2005 | Chen et al. | 725/115 |
| 2006/0064716 A1 * | 3/2006 | Sull et al. | 725/37 |
| 2006/0080167 A1 | 4/2006 | Chen et al. | |
| 2006/0112080 A1 | 5/2006 | Chen et al. | |
| 2006/0224987 A1 * | 10/2006 | Caffarelli | 715/767 |
| 2006/0236344 A1 * | 10/2006 | Brain et al. | 725/61 |

(Continued)

FOREIGN PATENT DOCUMENTS
WO   2006131887 A1   12/2006

OTHER PUBLICATIONS
Malik, Game Consoles, Web 2.0 . . . Really?, Nov. 20, 2006, retrieved from http://gigacom.com on Jun. 14, 2011.*

(Continued)

*Primary Examiner* — Weilun Lo
*Assistant Examiner* — Amy M Levy
(74) *Attorney, Agent, or Firm* — Vierra Magen Marcus & DeNiro LLP

(57) ABSTRACT

An interface allows navigation of a hierarchy of related content organized into a node tree. Each node may be associated with media content and navigation input may be received to navigate between the nodes. The interface includes a mechanism for viewing graphical data representing related content within the node tree. A user may provide input to navigate between nodes in the same hierarchy level or different hierarchy levels while graphical data for the selected node is provided in the interface.

18 Claims, 12 Drawing Sheets

U.S. PATENT DOCUMENTS

| | | | |
|---|---|---|---|
| 2007/0038931 A1* | 2/2007 | Allaire et al. ............... | 715/526 |
| 2007/0100800 A1 | 5/2007 | Rose et al. | |
| 2007/0101394 A1 | 5/2007 | Fu et al. | |
| 2007/0208830 A1 | 9/2007 | Stuckman et al. | |
| 2007/0250864 A1 | 10/2007 | Diaz Perez | |
| 2008/0072139 A1* | 3/2008 | Salinas et al. ............... | 715/238 |

OTHER PUBLICATIONS

Zhang et al. "A personalized TV guide system compliant with MHP," Consumer Electronics, IEEE Transactions on , vol. 51, No. 2, pp. 731-737, May 2005 doi: 10.1109/TCE.2005.1468026.*

J. Messen et al., JPEG2000 Based Scalable Summary for Remote Video Content Browsing and Efficient Semantic Structure Understanding, http://www.multitel.be/~messejer/PDF/MessenXuMacq_Ewimt_CameraReady.pdf.

Howard D. Wactlar, Informedia—Search and Summarization in the Video Medium, 2000, pp. 1-10, Proceedings of Imagina 2000 Conference, Monaco.

MediaRig Mosaic, Copyright 2005-2007 Ligos Corporation, http://ligos.com/index.php/home/products/mediarig_mosaic/.

* cited by examiner

INTERFACE FOR NAVIGATING INTERRELATED CONTENT HIERARCHY

BACKGROUND

Digital media is widely available for download over the Internet using computers. Some computers allow a user to browse media content by navigating through images representing a chapter in a digital video. For example, a user may sequence through the chapters of a DVD movie to view a representative image for each chapter in the movie.

The interfaces for computers that allow a user to browse media content are restricting because they typically provide a sequence of images associated with a single element of digital media. The interfaces are not used to provide information for more than a single movie or video. Rather, a user is limited to browsing between a set of images representing different points of time in a single video.

SUMMARY

An interface is provided for navigating a hierarchy of related content. The content can be organized into a hierarchical tree of nodes. Each node may be associated with media content, such as a television show season, episode, segment, or other content. Navigation input may be received through an interface to navigate between the nodes. The interface includes a mechanism for viewing graphical data representing related content within the node tree. A user may provide input to navigate between nodes in the same hierarchy level or different hierarchy levels while graphical data for the selected node is provided in the interface.

The interface is used to browse different hierarchy levels of related content. For example, the related content may be an ordered sequence of television show seasons, episodes for each season, video segments for each episode, or other content, with each content element associated with a node. A user may navigate through the node tree by providing input to traverse to a sibling node (within the same level of the hierarchy) or to a parent or child node (to a different level of the hierarchy). Nodes of the hierarchy may be represented through an interface in a row of graphical content or images. The row of images may include a series of images, including an image for a "current" node and images for sibling nodes that are sequentially located on either side of the current node. As input is received to navigate through the hierarchy, the current node and sibling nodes are updated and new graphical information or images are provided in the user interface to represent the updated nodes.

An embodiment retrieves data by a client from a server. The client is capable of downloading digital media content which is part of a set of related digital media content. The data includes graphical data and describes a hierarchical structure having two or more hierarchy levels for the set of digital media content. After retrieving the data, the client provides an interface which includes graphical information for two or more nodes in a first level of the hierarchal structure. The interface indicates that one of the two or more nodes is a currently selected node. Navigation input is then received by the client and the interface is provided with graphical information for a first set of two or more nodes in a second level of the hierarchical structure.

An embodiment receives node tree data for a set of digital content and constructs a table from the node tree data, where the node tree data having a hierarchy with two or more levels of nodes. A first current node is selected and one or more peripheral nodes is then identified from the current node and the table. An interface is then constructed to provide to a display device. The interface includes a row of graphical information for a first current node and first set of one or more peripheral nodes, where the graphical information is positioned sequentially in the row according to a sequential relationship between the first nodes. Input is then received by the client with respect to the current node and the interface is re-constructed. The interface reconstruction replaces the row of graphical information associated with the current node and one or more peripheral nodes with a second current node and second set of one or more peripheral nodes. The new nodes are associated with a different hierarchy level than the first nodes and are positioned sequentially in the row according to a sequential relationship between the second nodes.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

DETAILED DESCRIPTION

The technology described herein pertains to an interface provided for navigating a hierarchy of related content. The content can be organized into a hierarchical tree of nodes. Each node may be associated with media content, such as a television show season, episode, segment, or other content. Navigation input may be received through an interface to navigate between the nodes. The interface includes a mechanism for viewing graphical data representing related content within the node tree. A user may provide input to navigate between nodes in the same hierarchy level or different hierarchy levels while graphical data for the selected node is provided in the interface.

The interface is used to browse different hierarchy levels of related content. The related content may be an ordered sequence of television show seasons, an ordered sequence of the episodes for each season, an ordered sequence of video segments for each episode, and other content, with each content element associated with a node. A user may navigate through the node tree by providing input to traverse to a sibling node (within the same level of the hierarchy) or to a parent or child node (to a different level of the hierarchy). For example, a user may currently be navigating between nodes representing episodes of a TV show. A user may provide navigation input to traverse between different episodes in a sequential order, navigate to a lower level in the hierarchy to view different segments of a particular episode, or navigate up a hierarchy level to view different seasons of the TV show. In some embodiments, each node in a set of hierarchical content is connected to at least one sibling node as well as a parent or child node, or both.

Nodes of the hierarchy may be represented through an interface in a row of graphical content. In some embodiments, the images are represented in a "film strip" of graphical image data, wherein each node is represented by graphical information such as an image. The film strip row of images may include a series of images, including an image for a "current" node and images for sibling nodes that are sequentially located on either side of the current node. As input is received to navigate through the hierarchy, the current node and sibling nodes are updated and new graphical information or images are provided in the user interface to represent the updated nodes.

Figure 1A:
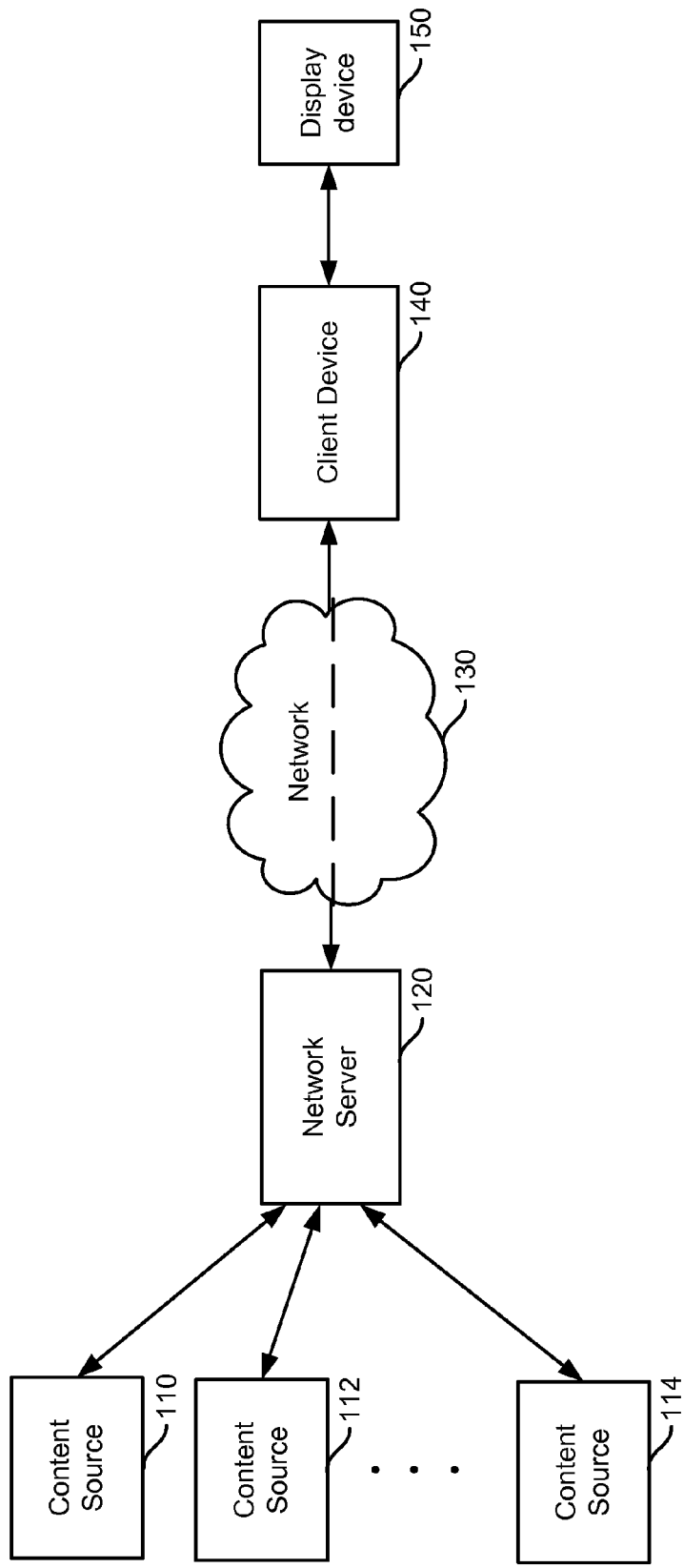
FIG. 1A is a block diagram of an embodiment of a system for providing an interface.

FIG. 1 is a block diagram of an embodiment of a system for providing an interface. The system of FIG. 1 includes content sources 110, 112 and 114, network server 120, client device 140 and display device 150. Content sources 110-114 may communicate with network sever 120 and each be implemented as one or more servers, databases, or some other device. In some embodiments, one more of content sources 110-114 may be implemented on network server 120. Each of content sources 110, 112, and 114 may contain video, audio, slide shows or other media content and provide such content to network server 120.

Network server 120 communicates with content sources 110-114 and client device 140. Network server communicates with client device 140 over network 130. Network 130 may be implemented as the Internet or other WAN, a LAN, intranet, extranet, private network or other network or networks. In some embodiments, network server 120 may communicate with client device 140 via satellite, phone line, broadcast antenna or some other medium (not illustrated in FIG. 1A). In some embodiments, network server 120 may be implemented as a web server and provide a web service over network 130. For example, when network 130 is implemented as the Internet, network server 120 may be implemented as a web server and provide a web service to client device 140. When processing requests, network server 120 may access content from one or more of content sources 110-114.

Client device 140 may communicate with network server 120 and display device 150. Client device 140 may render an interface on display device 150 to provide graphical data, audio data, video data and other data. Client device 140 may be implemented as a cell phone, DVD player, set top box, gaming console or some other computing device. In some embodiments, client device 140 is implemented as an "X-Box 360" gaming console by Microsoft Corporation, of Redmond, Wash.

Display device 150 communicates with client device 140. In some embodiments, display device 150 may be implemented as a TV, LCD or other monitor which provides video, graphics, audio and/or other media content.

Figure 1B:
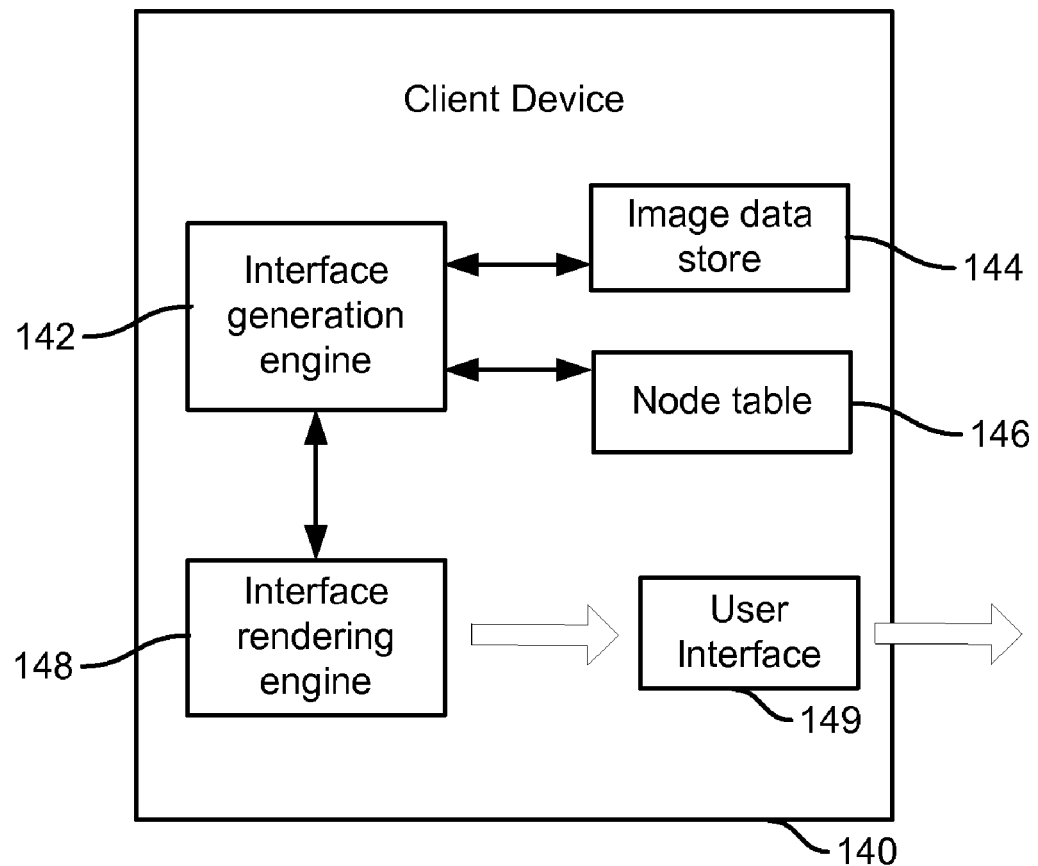
FIG. 1B is a block diagram of an embodiment of a client device.

FIG. 1B is a block diagram of an embodiment of a client device 140. FIG. 1B provides more detail for the client device of FIG. 1A. Client 140 includes interface generation engine 142, image data store 144, node table 146, interface rendering engine 148, and user interface 149. Other components, such as a decoder, network I/O, and other components, may also be included in client device 140 but are not shown in FIG. 1B for purposes of discussion.

Interface generation engine 142 constructs an interface framework and populates the framework with graphical, audio, or other data. The engine may communicate with image data store 144, node table 146 and interface rendering engine 148 to generate the interface. To construct an interface framework, generation engine 142 may retrieve graphic data from image data store 144. The generation engine may determine what graphical data to include in the interface and where to place the graphical data within the interface be accessing node table 146.

Image data store 144 stores graphical data retrieved from server 120 by client device 140. The graphical data contained in data store 144 is placed in the interface by the generation engine. Node table 146 is constructed from node tree data retrieved from server 120. Node table 146 is discussed in more detail below with respect to FIG. 7.

After constructing an interface, the interface is rendered by interface rendering engine 148. Rendering the interface includes generating graphical data to represent the user interface in a format which can be displayed by display device 150. User interface 149 is discussed in more detail below with respect to FIG. 5.

Figure 1C:
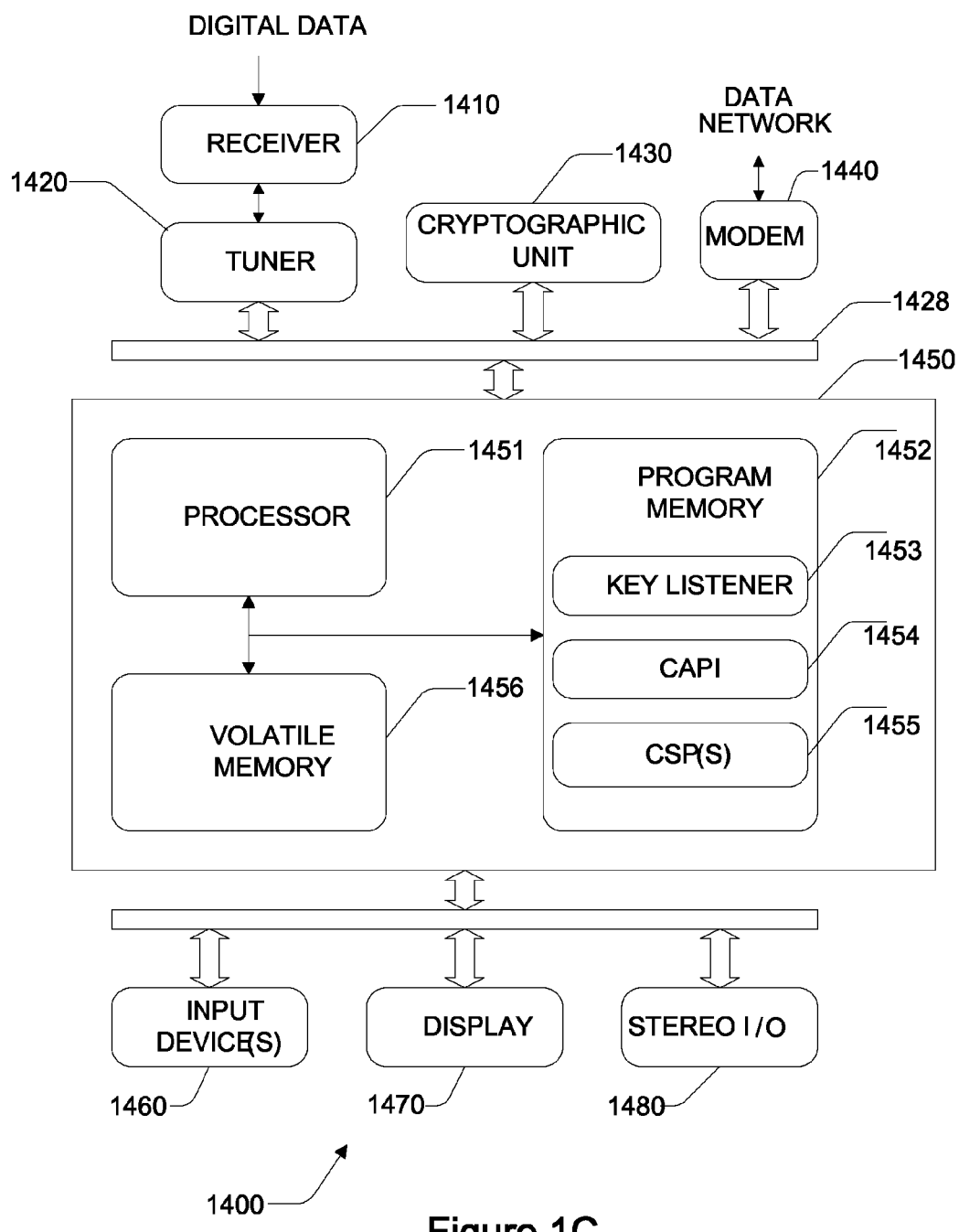
FIG. 1C is a block diagram of an embodiment of a broadcast-enabled electronic media device that may serve as a platform.

At least some of the embodiments disclosed herein may be implemented on a media device that a user interacts with when viewing media content. FIG. 1C shows an example configuration of a broadcast-enabled electronic media device 1400 having user input device(s) 1460 allowing user interaction with media content. In one embodiment, the device 1400 serves as a platform for the media receiver 1410, the media presentation device 1470, and the user input device 1460. Device 1400 includes a central processing unit 1450 having a processor 1451, volatile memory 1456 (e.g., RAM), and program memory 1452 (e.g., ROM, Flash, disk drive, floppy disk drive, CD-ROM, etc.). The device 1400 has one or more input devices 2460 (e.g., keyboard, mouse, etc.), a video display 1470 (e.g., VGA, SVGA), and a stereo I/O 1480 for interfacing with a stereo system.

The device 1400 includes a digital broadcast receiver 1410 (e.g., satellite dish receiver, RF receiver, microwave receiver, multicast listener, etc.) and a tuner 1420 which tunes to appropriate frequencies or addresses of the broadcast network. The tuner 1420 is configured to receive digital broadcast data in a particularized format, such as MPEG-encoded digital video and audio data, as well as digital data in many different forms, including software programs and programming information in the form of data files. The device 1400 also has a modem 1440 which provides dial-up access to the data network 1428 to provide a back channel or direct link to the server 1450. In other implementations of a back channel, the modem 1440 might be replaced by a network card, or an RF receiver, or other type of port/receiver which provides access to the back channel.

The device 1400 runs an operating system which supports multiple applications. The operating system may be a multi-tasking operating system which allows simultaneous execution of multiple applications. The operating system may employ a graphical user interface windowing environment which presents the applications or documents in specially delineated areas of the display screen called "windows."

The device is illustrated with a key listener 1453 to receive the authorization and session keys transmitted from the server 1450. The keys received by listener 1453 are used by the cryptographic security services implemented at the device 1400 to enable decryption of the session keys and data. Cryptographic services are implemented through a combination of hardware and software. A secure, tamper-resistant hardware unit 1482 is provided external to the CPU 1460 and two software layers 1454, 1455 executing on the processor 1451 are used to facilitate access to the resources on the cryptographic hardware 1430.

The software layers include a cryptographic application program interface (CAPI) 1484 which provides functionality to any application seeking cryptographic services (e.g., encryption, decryption, signing, or verification). One or more cryptographic service providers (CSPs) implement the functionality presented by the CAPI to the application. The CAPI layer 1454 selects the appropriate CSP for performing the requested cryptographic function. The CSPs 1455 perform various cryptographic functions such as encryption key management, encryption/decryption services, hashing routines, digital signing, and authentication tasks in conjunction with the cryptographic unit 1482. A different CSP might be configured to handle specific functions, such as encryption, decryption, signing, etc., although a single CSP can be implemented to handle them all. The CSPs 1455 can be implemented as dynamic linked libraries (DLLs) that are loaded on demand by the CAPI, and which can then be called by an application through the CAPI 1454.

Figure 2A:
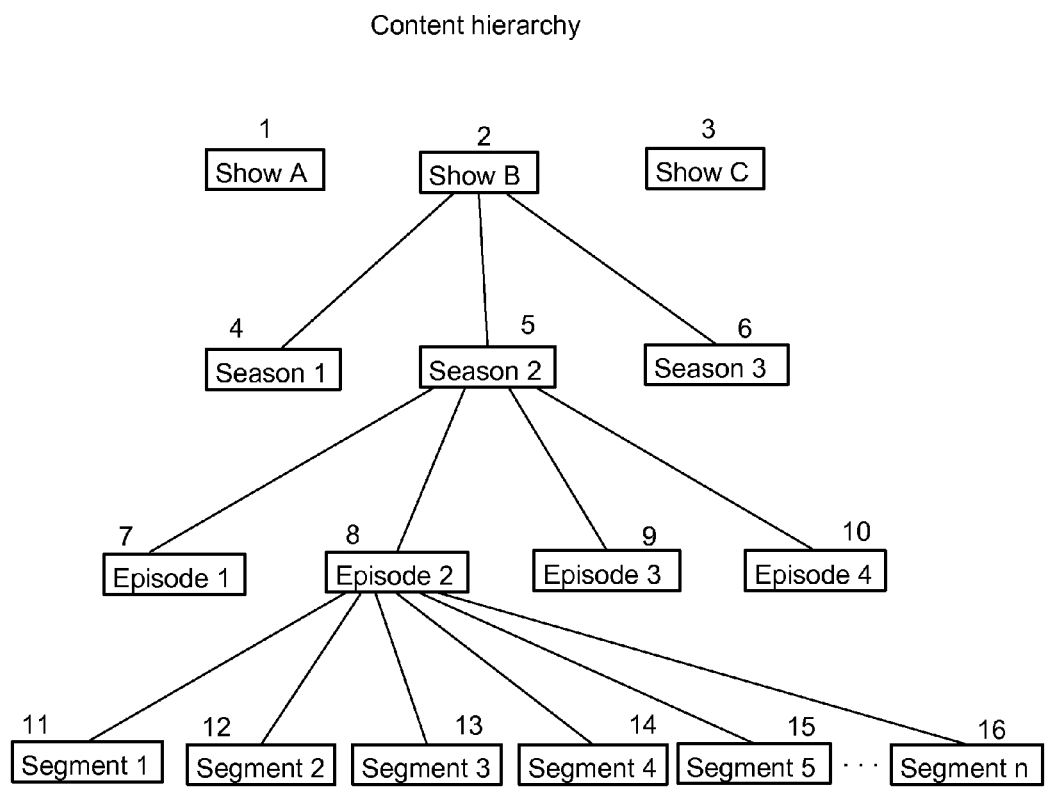
FIG. 2A is an example of a hierarchical structure of related media content.

FIG. 2A is an example of a hierarchy of related media content. The example hierarchy of FIG. 2A contains data for television shows, but other media content can be used with the present technology as well. Each node in the hierarchy is numbered and has at least one child node, parent node or sibling node. At the top layer of the hierarchy, nodes 1, 2 and 3 are shown for shows A, B and C, respectively. Three season nodes are illustrated as children nodes for node 2, as season 1 (node 4), season 2 (node 5), and season 3 (node 6). For the season 2 node, 4 children nodes are illustrated a nodes 7, 8, 9 and 10. Episode 2 is illustrated as having several segment children nodes as nodes 11-16. The content hierarchy may be navigated by a user using an interface of the present technology. For example, if a user is currently viewing graphical information for node 5 (episode two), the user could provide navigation input to view graphical information for episode 1 or episode 3 to remain at the current hierarchy level. Moreover, a user may provide input to navigate to a different hierarchy level to view graphical information for the seasons of a TV show or the segments of the selected episode 2.

Figure 2B:
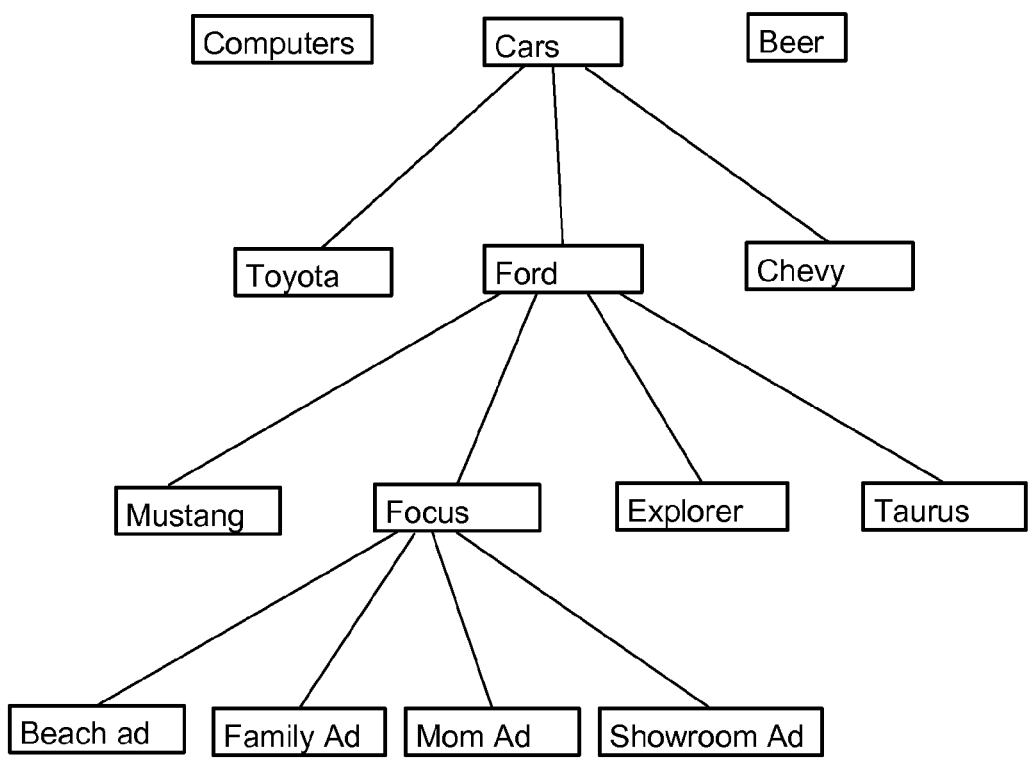
FIG. 2B is an example of a hierarchical structure of related advertisement content.

In some embodiments, a node in a first node tree may be connected to a second node tree. For example, selection of an advertisement segment of an episode may enable a user to navigate through a tree of related advertisement content. FIG. 2B illustrates a node tree for advertisement content. The advertisement node tree of FIG. 2B may be linked to the television show node tree of FIG. 2A though a node of each tree, for example node 13 for segment 3 in the node tree of FIG. 2A and the "Family Ad" node of the node tree of FIG. 2B. The advertisement node tree of FIG. 2A includes root nodes of Computers, Cars and Beer, nodes Toyota, Ford and Chevy as child nodes of the Cars node, nodes Mustang, Focus, Explorer and Taurus as child nodes of the Ford node, and Beach Ad, Family Ad, Mom Ad and Showroom Ad as child nodes of the Focus node.

Figure 3:
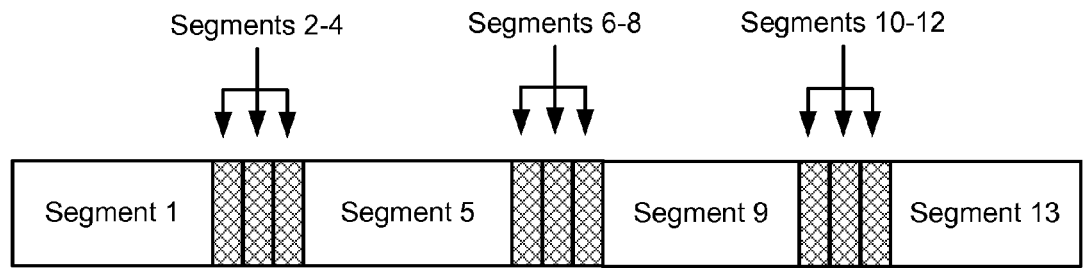
FIG. 3 is an example of digital content divided into segments.

FIG. 3 is an example of digital content divided into segments. The digital content includes four larger segments 1, 5, 9 and 13 and three smaller sets of smaller segments 2-4, 6-8 and 10-12. In one embodiment, the width of the segments represents a time length for the segment. The digital content represented by the segments of FIG. 3 may represent a one-hour length television episode. As such, segments 1, 5, 9 and 13 may each represent actual episode content and each of segments 2-4, 6-8 and 10-12 may represent a commercial or advertisement. Each segment of episode content and advertisement may be associated with a node in the node tree of FIGS. 2A and/or 2B.

Figure 4:
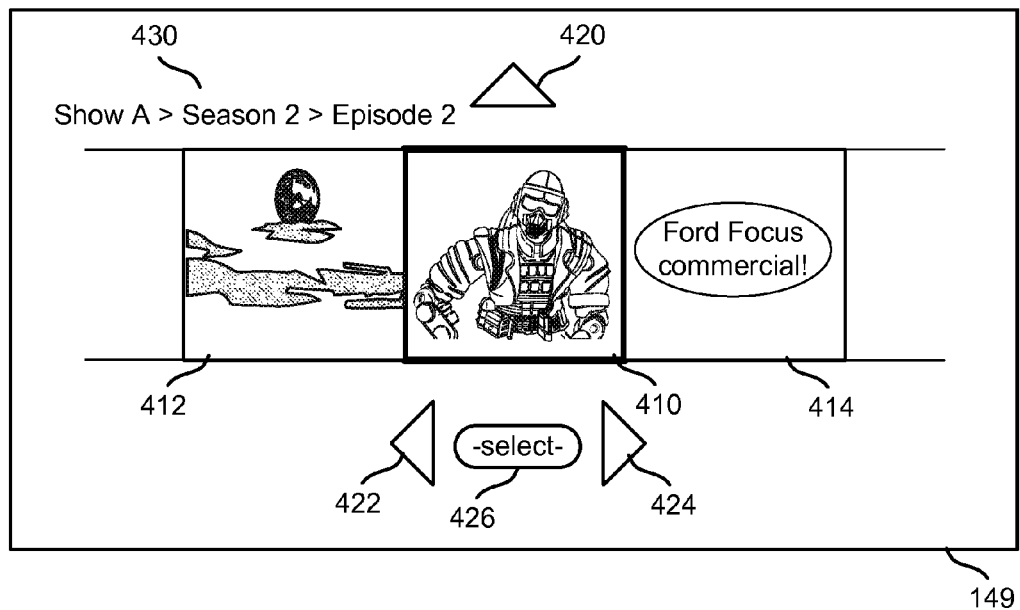
FIG. 4 is an example of a user interface.

FIG. 4 is an example of a user interface for navigating a node tree. The interface at FIG. 4 includes navigation buttons 420, 422, 424 and 426, images or graphical information 410, 412 and 414, and current level information 430. Image 412 represents a current node and images 412 and 414 represent sequential sibling nodes for the current node. Each of the images is contained within an image slot.

A user may navigate a node tree by providing input that selects one or more navigation buttons. Selection navigation button 410, represented as an up arrow, results in navigating up a level in the node tree to the parent node of the currently selected node. Selection of the left scroll or right scroll buttons 422 or 424 result in navigation to s sibling node of the current node within the same level of the node tree. Selection of select navigation button 426 results in navigation to a default child node of the current node. The current node description 430 indicates where the currently selected node is in the node tree. For example, current node description 430 indicates the current node of Episode 2 is located at "Show A>Season2>episode 2."

Figure 5:
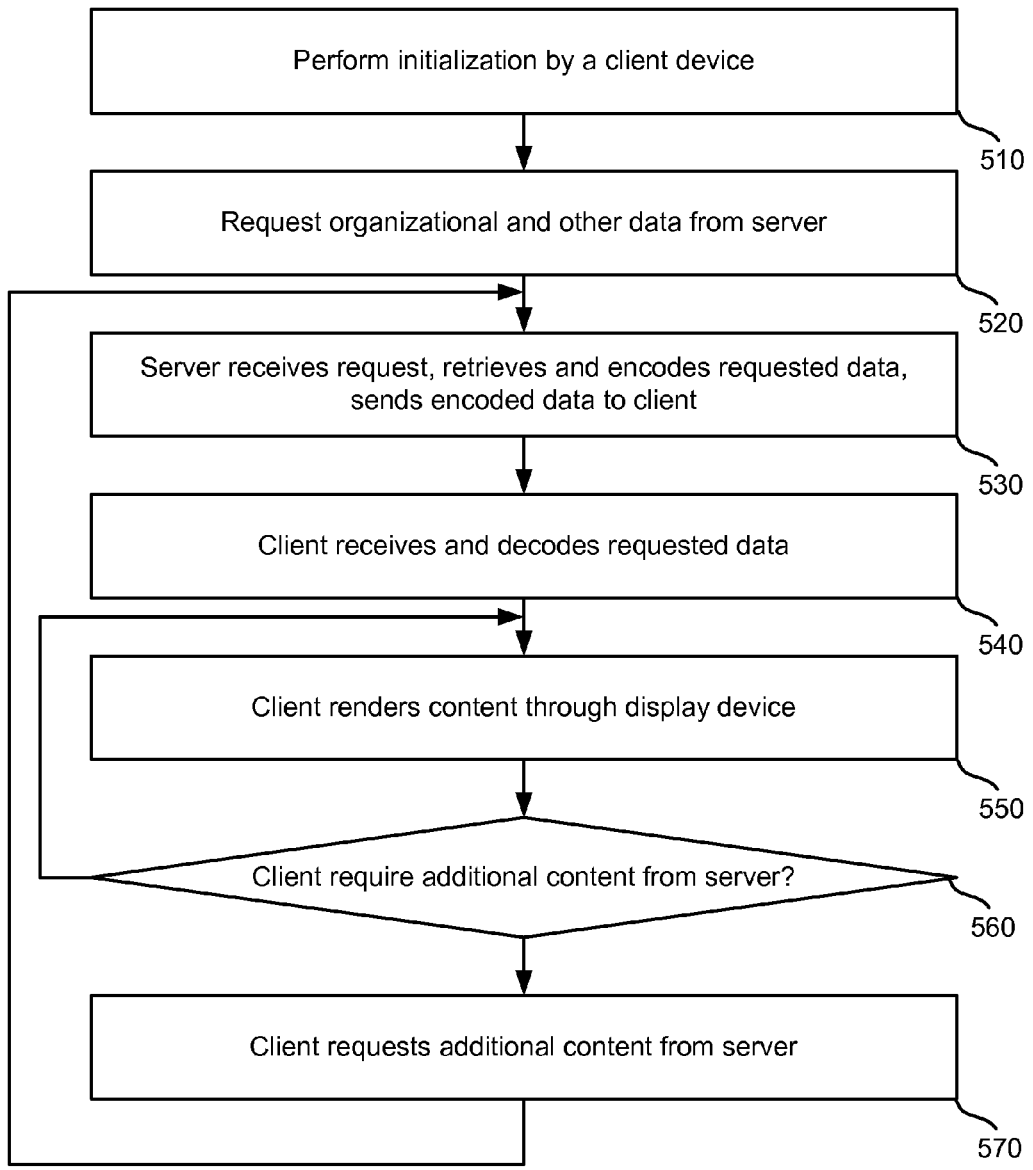
FIG. 5 is a flowchart of an embodiment of a method for providing an interface.

FIG. 5 is a flow chart of an embodiment of a method for providing an interface. First, client device 140 is powered up and performs an initialization process at step 510. The client device will then request node tree and other data from server 120 over network 130 at step 520. The node tree data describes the hierarchy of content within a node tree such as that illustrated in FIG. 2A. The other data may include one or more images, graphical information, relationship data or other data for each node.

Server 120 receives the client request, retrieves and encodes the requested data and sends the encoded data to client 140 at step 530. In retrieving the requested data, network server 120 may access digital media from any of content sources 110-114. The retrieved data is then encoded to transmit over network 130 to device 140. Client 140 receives and decodes the requested data at step 540.

Client 140 renders content through display device 150 at step 550. Rendering content through the display device includes displaying the user interface with images for one or more nodes of a node tree and updating the interface in response to receiving user navigation input. Rendering content through the display device is discussed in more detail below with respect to FIG. 6. A determination is made as to whether a client requires additional content from a server at step 560. In some embodiments, if a user selects a particular segment to playback in the user interface or new node tree must be retrieved, the content must be requested from the server by a client device. If additional content is required from a server, the client requests the additional content from server 140 at step 570 and the method of FIG. 5 returns to step 530. If additional content is not required, the method at FIG. 5 returns step 550.

Figure 6:
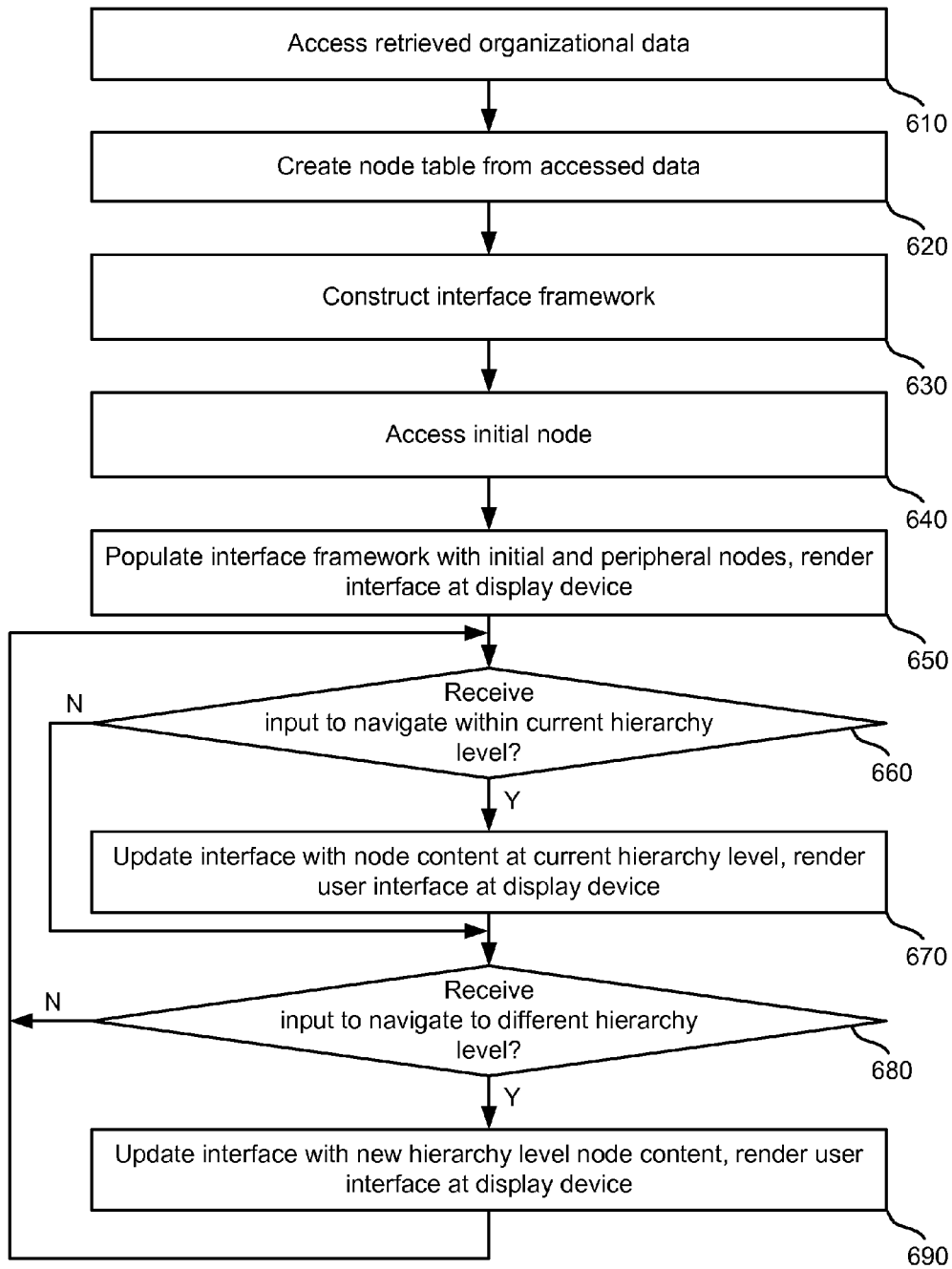
FIG. 6 is a flowchart of an embodiment of a method for rendering content through a display device.

FIG. 6 is a flow chart of an embodiment of a method for rendering content through a display device. In some embodiments, FIG. 6 provides more detail for step 550 in the method of FIG. 5. First, node tree data is accessed at step 610. A node table is then created from the accessed node tree data at step 620. The node table indicates relationships between each node in the hierarchy and links graphical information to each node. An example of a node table is discussed in more detail below with respect to FIG. 7. An interface framework is then constructed at step 630. The interface framework may contain a background image or graphics, a number of node or image slots, and other information other than the graphical information associated with a selected node and the selected node's surrounding nodes.

An initial node is accessed at step 640. The initial node may be set by default, specified in an initial user request, or otherwise determined. The interface framework is then populated with graphical data and rendered at step 650. The graphical information, such as one or more images, is associated with the initial node and surrounding sibling nodes, or peripheral nodes, for the initial node. The initial node is the currently selected node of the interface (the node associated with image 410 in the user interface at FIG. 4). The surrounding sibling nodes or peripheral nodes are the nodes on either side of the current node in the node tree. As discussed above, each set of nodes in a level of the node tree is sequentially ordered, for example by season number, by episode number, by the order in which a segment appears in an episode, or in some other manner. Thus, when a current node is selected, the peripheral nodes or surrounding sibling nodes are the nodes that appear before and after that node in that level of the node tree. The graphical data for all the nodes is identified using the node table and accessed from image data store 144. The populated interface framework is rendered on display device 150 by rendering engine 148.

After populating and rendering the interface framework, a determination is made as to whether input is received to navigate within the current hierarchy level at step 660. Navigating within the current hierarchy level indicates that a user has selected one of navigation buttons 422 or 424 to make a sibling node the current node. If input is received to navigate within the current hierarchy level of the node tree, the interface is updated with graphical information associated with the new set of nodes displayed in the interface and the user interface is rendered at the display device at step 670. In some embodiments, one or more images in a row of images are shifted in a horizontal direction and one new peripheral image may be added. Updating an interface with node content at the current hierarchy level is discussed in more detail below with respect to FIG. 8. If no input is received to navigate within the current hierarchy level at step 660, the method continues to step 680.

A determination is made as to whether input is received to navigate to a different hierarchy level at step 680. If no input is received to move to a different hierarchy level, then the method of FIG. 6 returns to step 660. If input is received to navigate to a different hierarchy level, then the interface is updated with graphical data for the nodes in the new hierarchy level and the user interface is rendered at display device 150 at step 690. Updating the interface may include retrieving one or more new images and placing the images in the user interface. Updating the interface with new hierarchy level node content is discussed in more detail below with respect to FIG. 9. After updating the interface at step 690, the method of FIG. 6 returns to step 660.

Figures 7, 8:
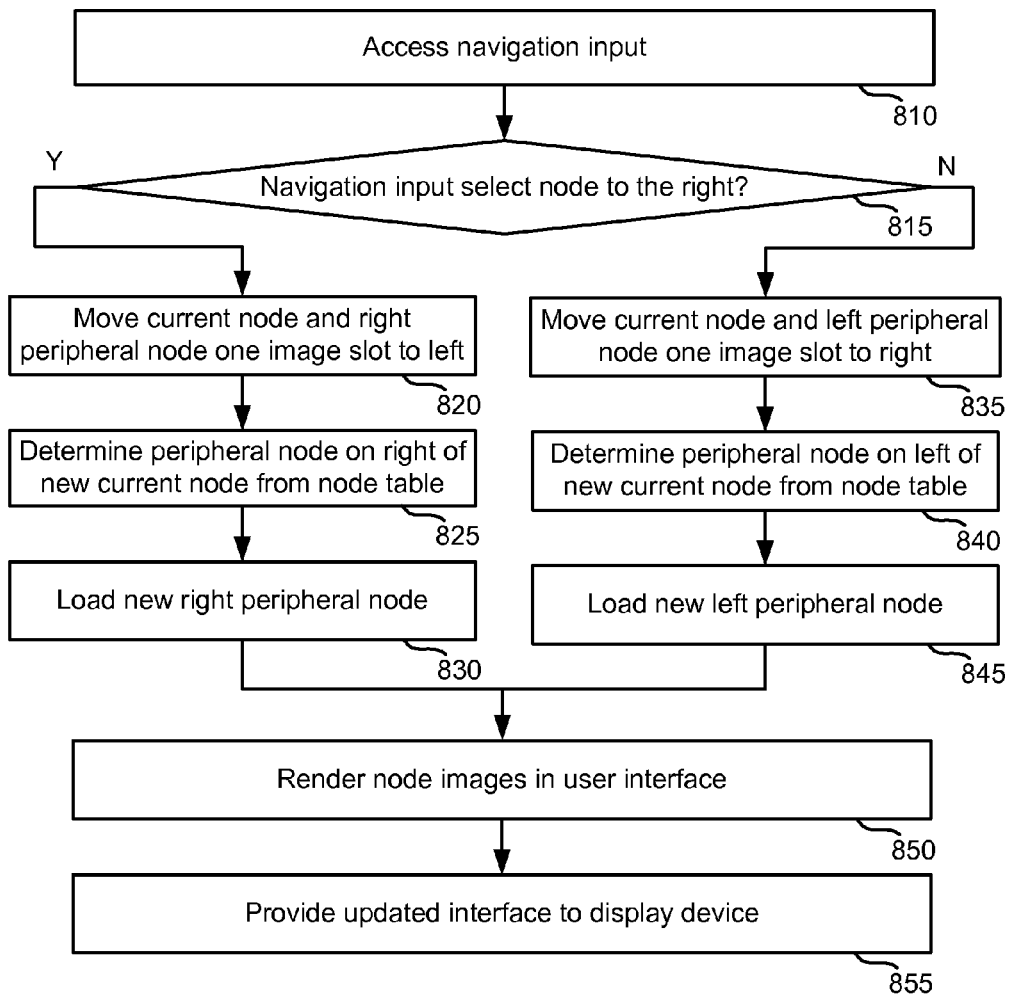
FIG. 7 is an example of a node table.
FIG. 8 is a flow chart of an embodiment through a method for updating an interface with content at a current hierarchy level.

FIG. 7 is an example of a node table. Node table 146 of FIG. 7 may be created at step 620 of the method at FIG. 6. The node table includes six columns which headings of node, left, right, parent, default child and image. Each node contained within a content hierarchy is listed in the node column. The node table of FIG. 7 includes two rows of node data. For each listed node, the sibling node which appears to the left of that particular node in the node sequence is identified in the "left" column. The node which appears to the right in the node level sequence is identified in the "right" column. For example, node 5 of FIG. 2 corresponds to "season 2". To the left of the "season 2 node" node is node 4 for "season 1" and to the right is node 6 for "season 3." For node 8 corresponding to "episode 4," node 9 corresponding to episode 3 is listed in the left column and node 11 corresponding to episode 5 is listed in the right column.

The parent column indicates a parent node for each particular node and a default child node indicates the default child for each particular node. When navigation input is selected to move up a level from a currently selected node, the node selected in the next highest level is the parent node for that particular node. When a current node is selected using the "select" button 426 in the interface at FIG. 4, the node selected is the default child node. For example, node 5 corresponding to season 2 has a parent node of node 2 corresponding to show B and a default child node 7 corresponding to episode 1. Node 8 corresponding to episode 2 has a parent node 5 corresponding to season 2 and a default child node 11 corresponding to segment 1. The image column indicates a graphical image, or other image, to provide in the user interface for each particular node.

Figure 10:
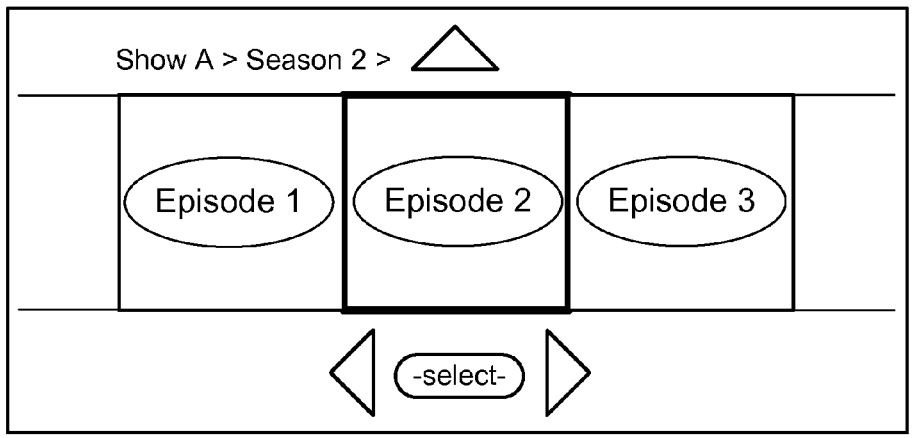
FIGS. 10-12 are examples of a user interface.
Figure 11:
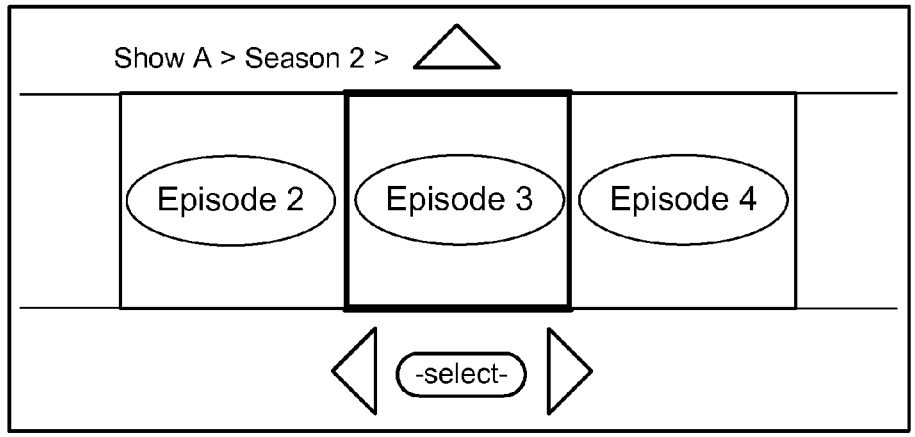

FIG. 8 is a flow chart of an embodiment of a method for updating an interface with content at a current hierarchy level. The method of FIG. 8 provides more detail for step 670 of the method at FIG. 6. First, navigation input is accessed at step 810. The navigation input was determined to be received at step 660. A determination is then made as to whether the navigation input selects a node to the right of the current node at step 815. Navigation input selecting a node to the right of the current node corresponds to selection of right arrow 424 in the user interface at FIG. 4. If the input selects a node to the right at step 815, the current node and the right peripheral node are moved one image slot to the left in a user interface at step 820. This progression is shown in FIGS. 10 and 11. In FIG. 10, the current node is episode 2 and the right peripheral node is episode 3. In FIG. 11, episodes 2 and 3 have each moved over one image slot so that the left peripheral image is episode 2 and the current node is now episode 3. A new peripheral node is determined for the right of the new current node from node table 146 at step 825. For example, for a current node of episode 3, it can be determined that the peripheral node to the right of that node would be episode 4. This is illustrated in user interface at FIG. 11. The new right peripheral node determined at step 825 is loaded at step 830 and the method of FIG. 8 continues to step 850.

If the navigation input does not select a node to the right, then the input has selected a node to the left using left arrow button 422 in the interface of FIG. 4. The current node and left peripheral node are moved one image slot to the right at step 835. A new peripheral node for the left of the new current node is then determined from node table 146 at step 840. The new left peripheral node is then loaded into the user interface at step 845 and the method continues to step 850.

Node images are rendered in user interface at step 850. The rendered node images include the shifted node images as well as well as a new peripheral node. The updated user interface is then provided to display device 150 at step 855.

Figure 9:
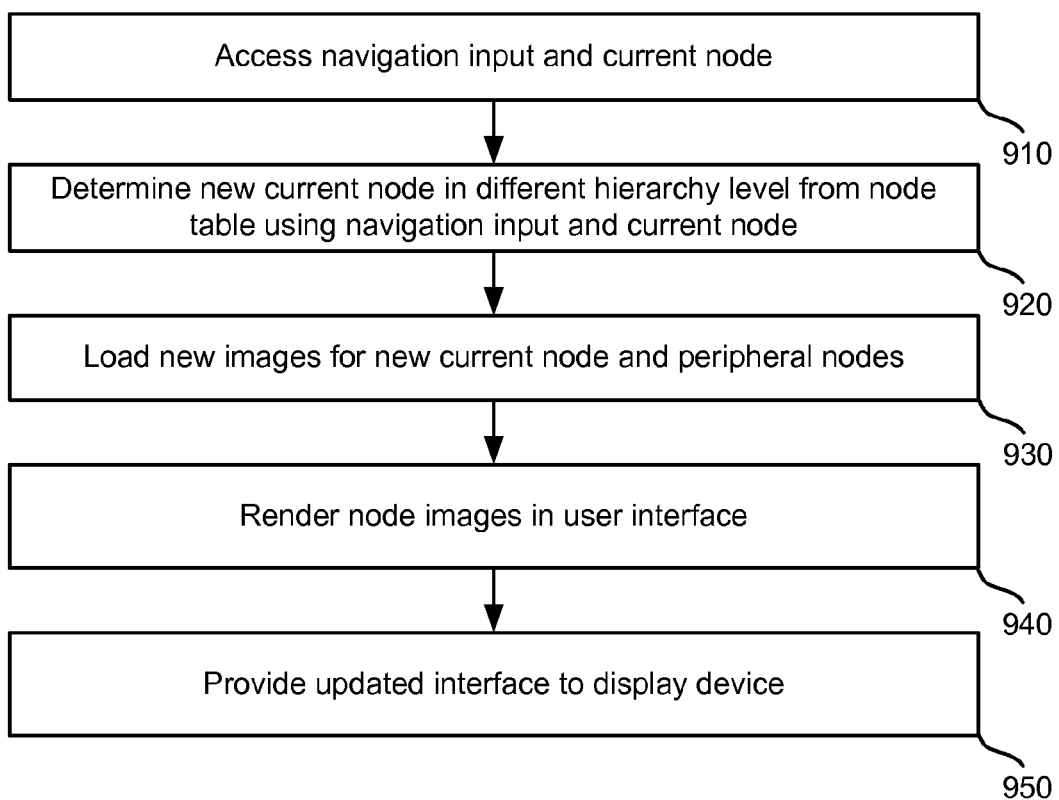
FIG. 9 is a flow chart of an embodiment through a method for updating an interface with content from a different hierarchy level.
Figure 12:
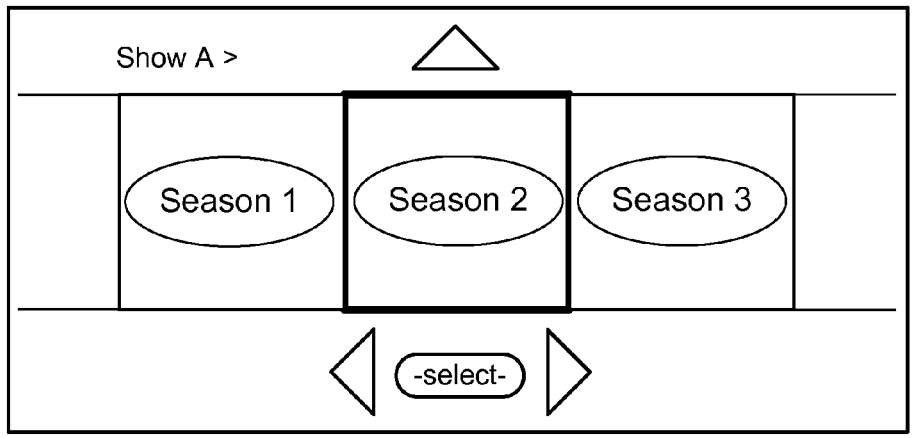

FIG. 9 illustrates a flow chart of an embodiment of a method for updating an interface with content from a different hierarchy level. The method of FIG. 9 provides more detail for step 690 of the method of FIG. 6. First, navigation input and the current node are accessed at step 910. The new current node in a different hierarchy level is then determined from the node table using the navigation input and the current node. For example, in node table 146 at FIG. 7, if the current node is node 5 and the input is up arrow 420, the user has indicated to navigate up to a parent level of the current node, which would be node 2 in the node table at FIG. 7. New images for the new current node and peripheral nodes are then loaded at step 930. The current node would be the parent node or default child node of the current node and the peripheral images for that new current node. The node images are then rendered in a user interface at step 940. Progression from one level in a hierarchy to another is illustrated in FIGS. 11 and 12. FIG. 11 illustrates a user interface with a current node of episode 3 and peripheral nodes of episodes 2 and 4. The user has selected an up arrow input to navigate to the hierarchy level above the episode level, resulting in a new current node of season 2 and peripheral nodes of seasons 1 and 3 in FIG. 12. The updated user interface is then provided to display device 150 at step 950.

Figure 13:
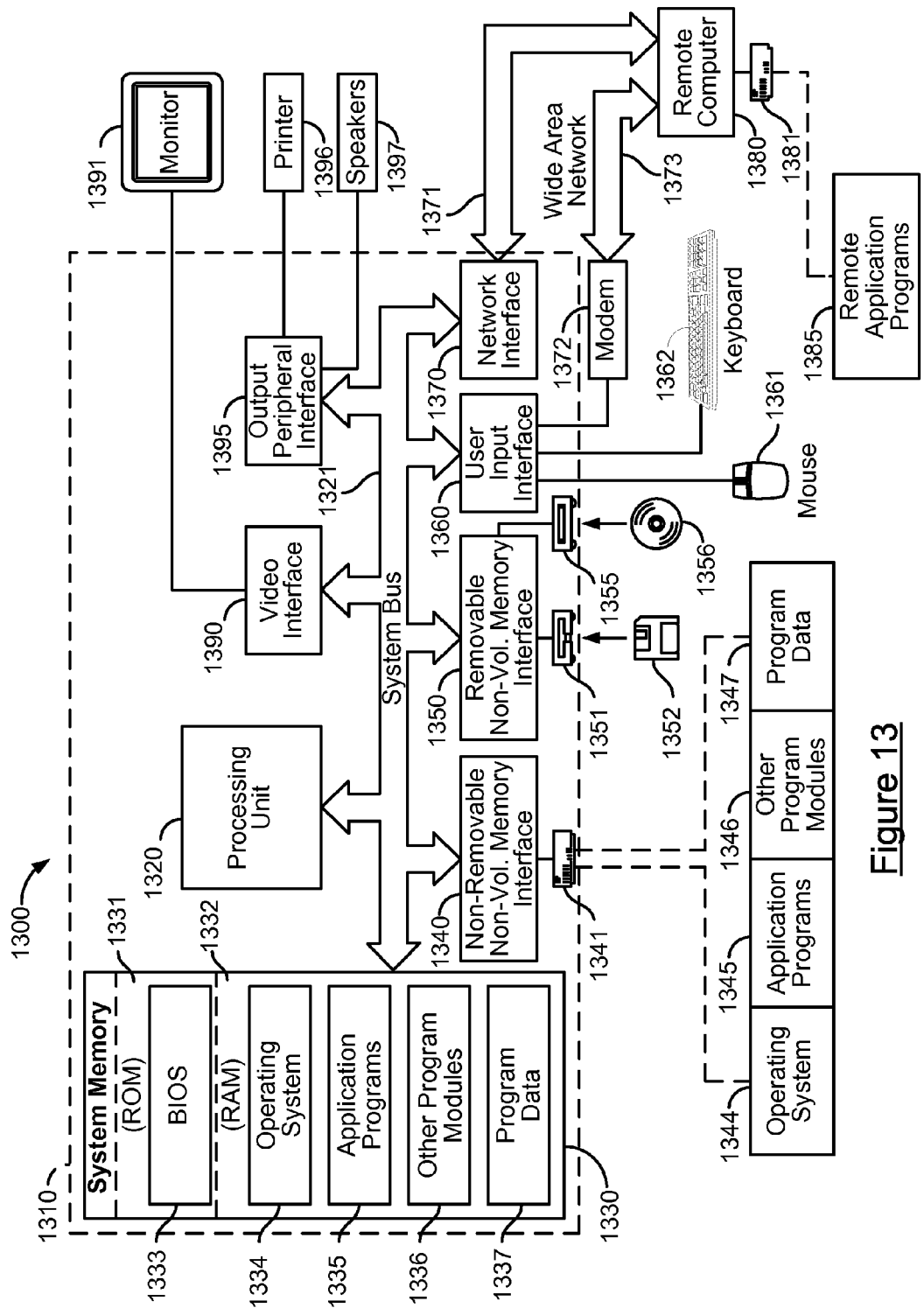
FIG. 13 is a block diagram of an embodiment of a computing environment.

FIG. 13 is a block diagram of an embodiment of a computing environment used to implement the present technology. In some embodiments, the computing environment of FIG. 13 may be used to implement content sources 110-114, network server 120, client device 140 and display device 150.

Computing environment 1300 of FIG. 13 is only one example of a suitable computing environment and is not intended to suggest any limitation as to the scope of use or functionality of the technology herein. Neither should the computing environment 1300 be interpreted as having any dependency or requirement relating to any one or combination of components illustrated in the exemplary operating environment 1300.

The technology described herein is operational with numerous other general purpose or special purpose computing system environments or configurations. Examples of well known computing systems, environments, and/or configurations that may be suitable for use with the technology herein include, but are not limited to, personal computers, server computers, hand-held or laptop devices, mobile phones or devices, multiprocessor systems, microprocessor-based systems, set top boxes, programmable consumer electronics, network PCs, minicomputers, mainframe computers, distributed computing environments that include any of the above systems or devices, and the like.

The technology herein may be described in the general context of computer-executable instructions, such as program modules, being executed by a computer. Generally, program modules include routines, programs, objects, components, data structures, and so forth that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

With reference to FIG. 13, an exemplary system for implementing the technology herein includes a general purpose computing device in the form of a computer 1310. Components of computer 1310 may include, but are not limited to, a processing unit 1320, a system memory 1330, and a system bus 1321 that couples various system components including the system memory to the processing unit 1320. The system bus 1321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1310 typically includes a variety of computer readable media. Computer readable media can be any available media that can be accessed by computer 1310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1330 includes computer storage media in the form of volatile and/or nonvolatile memory such as read only memory (ROM) 1331 and random access memory (RAM) 1332. A basic input/output system 1333 (BIOS), containing the basic routines that help to transfer information between elements within computer 1310, such as during start-up, is typically stored in ROM 1331. RAM 1332 typically contains data and/or program modules that are immediately accessible to and/or presently being operated on by processing unit 1320. By way of example, and not limitation, FIG. 13 illustrates operating system 1334, application programs 1335, other program modules 1336, and program data 1337.

The computer 1310 may also include other removable/non-removable, volatile/nonvolatile computer storage media. By way of example only, FIG. 13 illustrates a hard disk drive 1340 that reads from or writes to non-removable, nonvolatile magnetic media, a magnetic disk drive 1351 that reads from or writes to a removable, nonvolatile magnetic disk 1352, and an optical disk drive 1355 that reads from or writes to a removable, nonvolatile optical disk 1356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1341 is typically connected to the system bus 1321 through a non-removable memory interface such as interface 1340, and magnetic disk drive 1351 and optical disk drive 1355 are typically connected to the system bus 1321 by a removable memory interface, such as interface 1350.

The drives and their associated computer storage media discussed above and illustrated in FIG. 13, provide storage of computer readable instructions, data structures, program modules and other data for the computer 1310. In FIG. 13, for example, hard disk drive 1341 is illustrated as storing operating system 1344, application programs 1345, other program modules 1346, and program data 1347. Note that these components can either be the same as or different from operating system 1334, application programs 1335, other program modules 1336, and program data 1337. Operating system 1344, application programs 1345, other program modules 1346, and program data 1347 are given different numbers here to illustrate that, at a minimum, they are different copies. A user may enter commands and information into the computer 130 through input devices such as a keyboard 1362 and pointing device 1361, commonly referred to as a mouse, trackball or touch pad. Other input devices (not shown) may include a microphone, joystick, game pad, satellite dish, scanner, or the like. These and other input devices are often connected to the processing unit 1320 through a user input interface 1360 that is coupled to the system bus, but may be connected by other interface and bus structures, such as a parallel port, game port or a universal serial bus (USB). A monitor 1391 or other type of display device is also connected to the system bus 1321 via an interface, such as a video interface 1390. In addition to the monitor, computers may also include other peripheral output devices such as speakers 1397 and printer 1396, which may be connected through an output peripheral interface 1390.

The computer 1310 may operate in a networked environment using logical connections to one or more remote computers, such as a remote computer 1380. The remote computer 1380 may be a personal computer, a server, a router, a network PC, a peer device or other common network node, and typically includes many or all of the elements described above relative to the computer 1310, although only a memory storage device 1381 has been illustrated in FIG. 13. The logical connections depicted in FIG. 13 include a local area network (LAN) 1371 and a wide area network (WAN) 1373, but may also include other networks. Such networking environments are commonplace in offices, enterprise-wide computer networks, intranets and the Internet.

When used in a LAN networking environment, the computer 1310 is connected to the LAN 1371 through a network interface or adapter 1370. When used in a WAN networking environment, the computer 1310 typically includes a modem 1372 or other means for establishing communications over the WAN 1373, such as the Internet. The modem 1372, which may be internal or external, may be connected to the system bus 1321 via the user input interface 1360, or other appropriate mechanism. In a networked environment, program modules depicted relative to the computer 1310, or portions thereof, may be stored in the remote memory storage device. By way of example, and not limitation, FIG. 13 illustrates remote application programs 1385 as residing on memory device 1381. It will be appreciated that the network connections shown are exemplary and other means of establishing a communications link between the computers may be used.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

I claim:

1. A computer implemented method for providing an interface, comprising:

retrieving data by a client from a server, the client capable of downloading digital media content that is part of a set of related digital media content, the data including graphical data and describing a first hierarchical structure for organizing the set of related digital media content and a second hierarchical structure for organizing advertising content, each of the first hierarchical structure and the second hierarchical structure having two or more hierarchy levels of nodes, each node of the first hierarchical structure representing digital media content in the set of related digital media content;

connecting the first hierarchical structure to the second hierarchical structure, connecting the first hierarchical structure to the second hierarchical structure including linking a node in the first hierarchical structure to a node in the second hierarchical structure;

providing an interface by the client for navigating the first hierarchical structure of the set of related digital media content and the second hierarchical structure, the interface including first graphical information for a first set of two or more nodes in a first hierarchical level of the first hierarchical structure, the interface indicating that a first node of the first set of two or more nodes is a currently selected node;

receiving a first navigation input by the client;

determining, in response to receiving the first navigation input, a second set of two or more nodes including at least one parent node or child node of the currently selected node in a second hierarchical level of the first hierarchical structure, and one or more peripheral nodes of said at least one parent or child node, wherein one or more peripheral nodes of said at least one parent or child node are in the second hierarchical level of the first hierarchical structure or in the second hierarchical structure; and updating the interface to replace said first graphical information with second graphical information associated with the second set of two or more nodes, said second graphical information associated with said second set of two or more nodes is provided in a horizontal row of frames according to a sequential relationship between said at least one parent or child node and said one or more peripheral nodes of said at least one parent or child node.

2. The computer implemented method of claim 1, wherein said step of receiving the first navigation input includes:

receiving a selection of an interface element by the client, the element associated with navigating to a parent node of the currently selected node, the second set of two or more nodes including the parent node of the currently selected node.

3. The computer implemented method of claim 1, wherein said step of receiving the first navigation input includes:

receiving a selection of an interface element by the client, the element associated with navigating to a default child node of the currently selected node, the second set of two or more nodes including the default child node of the currently selected node.

4. The computer implemented method of claim 1, further comprising:
receiving a second navigation input associated with navigating within the second level of the first hierarchical structure; and
providing the interface with third graphical information associated with a third set of two or more nodes in response to receiving the second navigation input, the second set of nodes and the third set of nodes associated with the second level of the first hierarchical structure and having one or more overlapping nodes.

5. The computer implemented method of claim 4, wherein the third graphical information associated with the third set of two or more nodes includes a shift in position of a portion of the second graphical information for the second set of nodes.

6. The computer implemented method of claim 4, wherein the third graphical information associated with the third set of two or more nodes includes an addition of graphical information for nodes contained in the third set of nodes and not contained in the second set of nodes.

7. The computer implemented method of claim 1, wherein the first graphical information for the first set of two or more nodes is provided in a first linear collection of frames in the interface.

8. The computer implemented method of claim 7, wherein the first linear collection of frames is positioned in a first horizontal row of frames in the first level of the first hierarchal structure according to a first sequential order associated with the first set of two or more nodes.

9. The computer implemented method of claim 8, wherein the first sequential order is based on a sequence of episodes for a television show, and the second sequential order is based on a sequence of seasons for the television show.

10. The computer implemented method of claim 1, wherein said step of providing an interface by the client includes:
accessing the currently selected node;
accessing a node table to determine one or more sibling nodes for the currently selected node; and
identifying graphical information associated with each of the one or more sibling nodes of the currently selected node from the node table.

11. One or more processor readable storage devices having processor readable code embodied on said processor readable storage devices, said processor readable code for programming one or more processors to perform a method comprising:
receiving node tree data describing a first hierarchical structure for organizing a first set of related digital content and a second hierarchical structure for organizing a second set of digital content, each of the first hierarchical structure and the second hierarchical structure having two or more hierarchical levels of nodes, each node representing digital content in the respective set of digital content;
constructing a table from the node tree data, said table identifies at least one parent or child node for each node in the first hierarchical structure and one or more peripheral nodes of said each node, said table includes one or more links identifying graphical information associated with said each node in the first hierarchical structure, wherein a peripheral node of at least one node in the first hierarchical structure is a node in the second hierarchical structure;
selecting a first current node from the first hierarchical structure;
identifying a first set of one or more peripheral nodes of the first current node from the table, the first current node and the first set of one or more peripheral nodes associated with a first hierarchical level;
constructing an interface for navigating the first hierarchical structure of the first set of digital content and the second hierarchical structure of the second set of digital content, the interface including first graphical information associated with the first current node and the first set of one or more peripheral nodes, said first graphical information associated with the first current node and the first set of one or more peripheral nodes is provided in a first horizontal row of frames in the first hierarchical level according to a first sequential relationship between the first current node and the first set of one or more peripheral nodes;
receiving input by the client with respect to the first current node; and
re-constructing the interface to replace the first graphical information associated with the first current node and the first set of one or more peripheral nodes with second graphical information associated with a second current node and a second set of one or more peripheral nodes of the second current node, the second current node and the second set of one or more peripheral nodes associated with a second hierarchical level different from the first hierarchical level, and said second graphical information associated with the second current node and the second set of one or more peripheral nodes is provided in a second horizontal row of frames in the second hierarchical level according to a second sequential relationship between the second current node and the second set of one or more peripheral nodes.

12. The one or more processor readable storage devices of claim 11, wherein the two or more levels of nodes in the first hierarchical structure include a show segment level, an episode level, and a season level.

13. The one or more processor readable storage devices of claim 11, wherein the table includes one or more records for each node, each record including a node number for a particular node and node numbers for one or more peripheral nodes for the particular node.

14. The one or more processor readable storage devices of claim 11, wherein said one or more processors are contained in a gaming console capable of retrieving the set of digital content over a network.

15. The one or more processor readable storage devices of claim 11, wherein the first set of digital content is associated with seasons, episodes and segments of a television show.

16. The one or more processor readable storage devices of claim 15, wherein the graphical information for each node in the first hierarchical structure is an image representing video content for a season, an episode or a segment associated with the television show.

17. A system for providing an interface, comprising:
a communication interface for communicating with a server and a display device;
a storage device that includes a node table and image data;
an interface generation engine that retrieves node tree data and one or more images from a server and stores the node tree data and images in the storage device, the node tree data describing a first hierarchical structure for organizing a set of related digital content having a hierarchy of two or more levels of nodes and a second hierarchical structure for organizing one or more advertisements, each node in the first hierarchical structure representing digital content in the set of related digital content, constructs the node table from the node tree data, said node table identifies at least one parent or child node for each node in the first hierarchical structure and one or more peripheral nodes of said each node, said node table includes one or more links to graphical information associated with said each node, connects the first hierarchical structure to the second hierarchical structure using a node in each of the first hierarchical structure and the second hierarchical structure, identifies a current node in the first hierarchical structure and determines one or more sequentially neighboring nodes and at least one child or parent node of the current node from the node table, constructs an interface framework for navigating the first hierarchical structure and the second hierarchical structure and populates the interface framework with graphical information associated with the current node, the sequentially neighboring nodes, and the at least one parent or child node, said populating the interface framework with graphical information includes populating the interface framework with images associated with the current node and the sequentially neighboring nodes in a horizontal row in a first hierarchical level of the first hierarchal structure according to a sequential relationship between the current node and the one or more sequentially neighboring nodes and populating the interface framework with images associated with the at least one parent or child node and one or more peripheral nodes of the at least one parent or child node, wherein one or more peripheral nodes of said at least one parent or child node are in a second hierarchical level of the first hierarchal structure different from said first hierarchical level or in the second hierarchical structure via a link from said at least one parent or child node;

an input mechanism for receiving user input, the interface generation engine identifying the current node based on the user input; and an interface rendering engine that renders the interface framework on the display device.

18. The system of claim 17, wherein the system includes a gaming console or a set top box.

* * * * *